June 23, 1970
E. D. JONES
3,516,887
METHOD FOR HEAT-SEALING PLASTIC FILM
Filed June 3, 1968
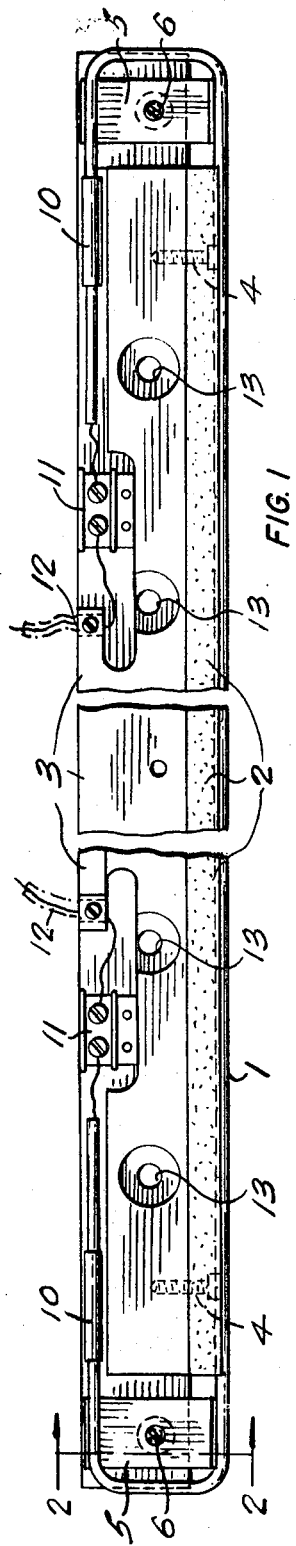
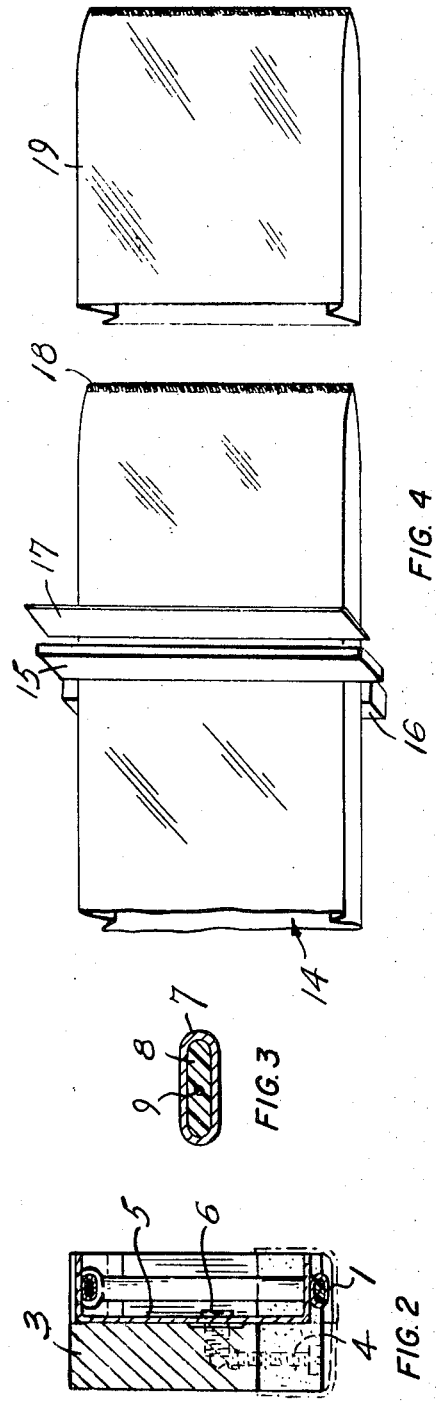
INVENTOR
Elwyn David JONES
PATENT AGENT

United States Patent Office 3,516,887
Patented June 23, 1970

3,516,887
METHOD FOR HEAT-SEALING PLASTIC FILM
Elwyn David Jones, Beloeil, Quebec, Canada, assignor to Canadian Industries Limited, Montreal, Quebec, Canada, a corporation of Canada
Filed June 3, 1968, Ser. No. 733,997
Claims priority, application Great Britain, June 22, 1967, 28,825/67
Int. Cl. B29c *19/02*
U.S. Cl. 156—272                                   1 Claim

ABSTRACT OF THE DISCLOSURE

A method for heat-sealing plastic film employing a coaxial sealer bar constituted by an elongated heating element insulated from a surrounding external tubular metallic sheath. The rate of heat transfer through the insulation is less than through the external metallic sheath. The coaxial sealer bar can be operated at higher temperatures than solid metallic bars permitting an increased rate of making heat seals.

---

This invention relates to a device for heat sealing plastic film.

Containers fabricated from plastic film are in common use for packaging materials such as fertilizers, peat moss, cement, etc. Such containers usually are in the form of bags fabricated by heat sealing plastic film such as polyethylene film. Efficient commercial production of such bags requires the rapid fabrication of strong seals between sheets of plastic film. Sealing means commonly employed consist of solid metal bars maintained at a constant temperature. In order to employ this type of sealer bar to make strong seals relatively low temperatures (300° F. to 350° F.) and proportionately longer contact times are required. If higher operating temperatures are employed poor seals results. However, in order to operate bag making machinery at high speeds higher sealing temperatures are required.

It has now been found that strong high speed seals can be made between sheets of plastic film if a heat-sealing element of coaxial configuration is employed. The coaxial heat-sealing element comprises an inner centrally located heating element, said element being embedded in an insulating medium which in turn is contained within a tubular metallic sheath. The rate of transfer of heat through the insulating medium is substantially less than the heat transfer through the metallic sheath. Employing this type of coaxial sealing element two ply 6 mil polyethylene film can be sealed in 0.4 second at a sealing element temperature in the range 450° F. to 500° F.

It is thus the primary object of this invention to provide a means for forming strong, high speed seals between sheets of plastic film. Additional objects will appear hereinafter.

The heat-sealing apparatus comprises an outer film-heating tubular metallic sheath and located coaxial with and in the interior of said sheath an elongated heating element, said heating element being separated from the metallic sheath by an insulating material having a lower rate of heat transfer than the metallic sheath, the metallic sheath being prevented from adhering to the heated film by a non-sticking sheath. The internal heating element may be an electrical resistance heating element.

An embodiment of the invention is illustrated in the accompanying drawings wherein FIG. 1 is a front elevation of the heat-sealing apparatus;

FIG. 2 is a vertical section of the line II—II of FIG. 1;

FIG. 3 is a cross sectional view of the heater rod; and

FIG. 4 is a diagrammatic view of the apparatus of FIG. 1 in use in the fabrication of plastic bags.

Referring to the drawings a coaxial heater rod is shown at 1. The heater rod is maintained in rigid position by means of a support assembly comprising a slotted insulator bar 2 and a recessed support bar 3 to which insulator bar 2 is attached by screws 4. The portion of the coaxial heater rod which contacts the plastic film to be sealed is flattened precisely to a configuration illustrated in FIG. 3. The forming of uniform seals requires that the film-contacting portion of the heater rod be shaped to close dimensional tolerances. The ends of the heater rod are shaped in U bends to which are affixed U-shaped metal clips 5. Clips 5 are fastened to support bar 3 by bolts shown at 6. The heater rod is prevented from sticking to the film by a coating of polytetrafluoroethylene, or by a sleeve of polytetrafluoroethylene tape.

FIG. 3 illustrates a cross section through the flattened section of the heater rod. At 7 is shown the metallic sheath which encloses ceramic insulation 8 and electrical resistance heating element 9. Electrical connections to the resistance element of the heater rod are made through junction box 10 and terminal block 11 to flexible conduit 12 which is connected to a source of electrical power. A thermocouple, not shown, is attached to the side of the film-contacting portion of the heater rod. The support bar is attached to a bag making machine by bolts fitting through bores 13.

The coaxial heater rod 1 may be conveniently a 3/16 diameter heater wire having an Inconel sheath, magnesia insulation and a 22 gauge Nichrome electrical element. It is necessary that the heater rod be of precise construction and produce a uniform heat flux. Within this limit alternative heating elements may be employed.

The insulator bar 2 of the support assembly can be fabricated from any heat insulating material that has high mechanical strength. Mechanical strength is required in order to avoid distortion of the heater rod during repeated operation of the sealing apparatus. Bonded mica has been found to be suitable.

The support bar 3 is conveniently fabricated from aluminium. It is necessary that the design of the support bar provide a support that is mechanically strong in order that distortion of the coaxial sealing element may be avoided.

Employing a heat sealing element of this invention it is possible to shape the element to the configuration of seal desired. It is convenient to employ a press in order to obtain precise shaping of the film-contacting part of the heat-sealing element.

The apparatus can be employed in conjunction with a known bag making machine of the type that advances a length of film intermittently in units of one bag length, the sealing and severing of the film taking place while the film is stationary. The sealing device is incorporated in the machine so that it compresses the film layers to be sealed against an anvil to form the seal. The use of the sealing device in making transversely sealed gusseted bags is illustrated in FIG. 4. The length of gusseted film is shown at 14. The sealing device is shown at 15 working against anvil 16 and flanked by blade 17 for severing the tubing adjacent to the seal. A finished seal is shown at 18 and a completed bag is shown at 19.

The heat sealing apparatus of this invention is capable of forming uniform strong seals between two sheets of 6 mil polyethylene film in 0.4 second contact time when operating at temperatures in the range 450° F. to 500° F. Employing solid sealing bars temperatures in the range 300° F. to 350° F. with correspondingly longer contact time would be required to make similar seals. The sealing elements of the invention also avoid the distortion introduced into solid sealer bars during heating and cooling.

What I claim is:

1. A method for heat-sealing plastic film wherein during sealing layers of film are compressed between an anvil and a heat-sealing element having an elongated tubular metallic sheath, said heat-sealing element being mounted in a movable support which is adapted to press the sheath against the anvil, which comprises heating the tubular metallic sheath of the heat-sealing element to a temperature in the range 450° F. to 500° F. by means of an elongated electric heating element located internally and coaxially of said sheath and separated therefrom by an insulating material having a lower rate of heat transfer than the metallic sheath, said electric heating element having terminals connected to a source of electric energy, the metallic sheath being protected by an external non-sticking covering; and compressing the layers of film that are to be sealed between said anvil and the heated sheath of said heat-sealing element for a period of time sufficient to heat-seal the layers of film.

References Cited

UNITED STATES PATENTS

| 429,559 | 6/1890 | Carpenter | 219—469 X |
| 2,012,335 | 8/1935 | Bergen | 219—541 |
| 2,526,906 | 10/1950 | Schaab et al. | 219—243 X |
| 2,535,171 | 12/1950 | Sundstrom | 219—243 X |
| 2,814,710 | 11/1957 | Schuetze | 219—245 X |
| 3,119,922 | 1/1964 | Mayhew | 156—579 |
| 3,196,067 | 7/1965 | Techtmann | 156—583 X |
| 3,243,574 | 3/1966 | Blythe et al. | 219—250 |
| 3,227,597 | 1/1966 | Wilson | 156—583 |
| 3,375,777 | 4/1968 | Techtmann | 100—93 |
| 3,401,439 | 9/1968 | Staats et al. | 219—244 X |

FOREIGN PATENTS 457,230   3/1950   Italy.

VOLODYMYR Y. MAYEWSKY, Primary Examiner

U.S. Cl. X.R.

156—583